United States Patent [19]

Brookes et al.

[11] 4,047,379
[45] Sept. 13, 1977

[54] TRANSIENT AIR TEMPERATURE SENSING SYSTEM

[75] Inventors: Neil Roger Brookes, Topsfield; Martin George Ray, Marblehead; Joseph David Cohen, Danvers; Thomas Joseph McCarey, Boxford, all of Mass.

[73] Assignee: General Electric Company, Lynn, Mass.

[21] Appl. No.: 680,909

[22] Filed: Apr. 28, 1976

[51] Int. Cl.$^2$ .......................... F02C 7/04; G01K 1/00
[52] U.S. Cl. ............................... 60/39.09 D; 73/349; 137/15.1
[58] Field of Search ................... 60/39.09 P, 39.09 D, 60/309 R; 132/15.1, 15.2; 73/346, 349; 55/306; 415/118

[56] References Cited

U.S. PATENT DOCUMENTS

| 3,167,960 | 2/1965 | Miesiak | 73/349 |
| 3,623,367 | 11/1971 | Benedict | 73/349 |
| 3,832,086 | 8/1974 | Hull et al. | 60/39.09 P |

FOREIGN PATENT DOCUMENTS

| 532,567 | 10/1954 | Belgium | 73/349 |

Primary Examiner—John J. Vrablik
Assistant Examiner—L. T. Casaregola
Attorney, Agent, or Firm—James W. Johnson, Jr.; Derek P. Lawrence

[57] ABSTRACT

In a gas turbine engine of the type which includes an inlet particle separator, there is provided apparatus for measuring the temperature of the air entering the engine compressor.

A remote temperature probe is disposed in a feed duct having an inlet in flow communication with the engine inlet upstream of the particle separator and an outlet disposed intermediate the particle separator and inlet to the engine compressor. Airflow through the feed duct is generated by the pressure drop across the particle separator without the use of compressor bleed or other air sources which result in performance degradation of the engine. Temperature measurement errors during engine anti-icing are reduced by selectively cross-bleeding a predetermined quantity of anti-icing air into the feed duct during activation of the engine's anti-icing system. The response rate of the probe is significantly improved by enclosing the probe in an impingement heat transfer blanket.

5 Claims, 2 Drawing Figures

TRANSIENT AIR TEMPERATURE SENSING SYSTEM

BACKGROUND OF THE INVENTION

This invention relates to a gas turbine engine of the type which includes an inlet particle separator and, more particularly, to apparatus for measuring the temperature of the air entering the compressor of such engines.

Gas turbine engines are commonly fitted with an instrument to measure the temperature of the working fluid entering the engine compressor. This device is generally referred to as a T2 probe since the fluid temperature immediately upstream of the first moving compressor stage is designated T2. The probe provides a signal proportional to T2 which is transmitted electrically, mechanically, hydraulically, or by a combination of these methods from the probe to the engine control system. The engine control system uses this signal to adjust engine speed, fuel flow and/or compressor stator vane angle to correct the aero-thermal characteristics of the engine and ensure proper function and power output for transient ambient conditions. Although necessary on stationary (land) gas turbines, this measurement of T2 is of prime importance in flight propulsion applications where sudden changes in ambient temperature occur due to altitude changes and the penetration of clouds and weather fronts. Since such changes in ambient temperature are often rapid, the response rate of the T2 probe must be sufficiently fast to allow correction of the engine's aero-thermal function to negate the possibility of compressor stall or other engine malfunction.

T2 probes currently used in gas turbine engines may be classified by their location in the engine. Such prior art T2 probes have either been located directly in line with the engine inlet airstream or have been located in a position remote from the main engine inlet airstream. Prior art mainstream and remote T2 probes may be electrical, mechanical, gas filled, or liquid filled.

Existing mainstream T2 probes generally provide good response rates but suffer several disadvantages. Their location in the main engine airstream creates turbulence in the area surrounding the probe and consequently provides aerodynamic wakes to the engine compressor. A further disadvantage is that such probes are subject to ice buildup in certain operating conditions which can cause foreign object damage to the engine. Consequently, such probes often must be fitted with an anti-icing system.

While a non-anti-iced mainstream probe provides a relatively fast and accurate output, anti-iced mainstream probes have lower response rates and often generate reading errors when the anti-ice system is activated. Further, anti-ice systems for such probes are often complex. Many probe anti-ice systems require hot compressor air and a variety of aero-thermal devices which result in performance penalties to the engine. Alternatively, electrical heating with its associated cost and complexity has also been used to anti-ice such prior art mainstream probes. Further, a failure of any of these prior art probe anti-ice systems may result in ice ball buildup around the probe and foreign object damage to the engine from ice ingestion.

Because of these problems with mainstream probes, other prior art engines have used remotely located T2 probes. Prior art remote T2 probes are generally mounted in a feed duct which draws air from the engine inlet over the probe and dumps it back into the engine inlet. The pressure differential required to flow the duct air has generally been provided by an eductor energized by high pressure air bled from the engine compressor. The loss of this air from the engine cycle has resulted in degradation of engine power and specific fuel consumption. The magnitude of this loss is dependent on the airflow and velocity necessary to generate the required probe response rate. While such prior art remote probes do not suffer from the icing problems of mainstream probes, response rate and accuracy improvements are desired, particularly during operation of engine anti-icing equipment at which time such prior art probes have exhibited transient reading errors.

SUMMARY OF THE INVENTION

It is, therefore, a primary object of the present invention to provide apparatus for sensing the temperature of the fluid entering the compressor of a gas turbine engine of the type which includes an inlet particle separator.

It is a further object of this invention to provide a temperature sensing system which exhibits improved response rates, without engine performance degradation and which eliminates the hazards associated with operating in climatic icing environments.

These and other objects of the invention have been achieved in the preferred embodiment of the invention wherein a gas turbine engine of the type which includes an inlet particle separator, there is provided a remote temperature sensing probe disposed in a feed duct.

The feed duct includes an inlet in flow communication with the inlet of the gas turbine engine at a point upstream of the inlet to the particle separator. The feed duct further includes an outlet disposed intermediate the outlet of the particle separator and inlet to the engine compressor. The pressure drop across the particle separator created by the pressure losses of the air flowing therethrough is sufficient to provide airflow through the feed duct during engine operation without the use of compressor bleed air which would result in performance degradation. This arrangement eliminates the icing problems associated with prior art systems in which the probe is located within the inlet airstream and further eliminates the engine performance penalties exhibited by prior art remote probe systems.

Temperature error during operation of the engine anti-icing system is significantly reduced by providing a cross bleed duct having one end in flow communication with the feed duct and the other end in flow communication with the source of engine anti-icing air. The cross bleed duct is sized to provide a predetermined quantity of anti-icing air to the feed duct during activation of the engine anti-icing system. This quantity of air is sufficient to elevate the temperature of the probe by the amount required to compensate for the elevated temperature of the air entering the compressor when the anti-icing system is activated. In this manner, reading errors of the probe resulting from operation of the engine anti-icing system may be greatly reduced.

To further improve the performance of the temperature sensing system of this invention, the remote temperature sensing probe may be surrounded by an impingement blanket. The impingement blanket is essentially a perforated sheath disposed in the feed duct surrounding the temperature probe. Air entering the feed duct passes over the blanket through the perforations therein to contact the probe in a uniform manner. Thereafter the air exits the bottom of the blanket which is ported to the outlet of the feed duct. The impingement blanket acts as a highly sensitive heat transfer device which significantly increases the thermal response time of the probe.

BRIEF DESCRIPTION OF THE DRAWINGS

The invention may be better understood upon reading the following description of the preferred embodiments in conjunction with the accompanying drawings wherein.

DESCRIPTION OF THE PREFERRED EMBODIMENT

Figures 1, 2:
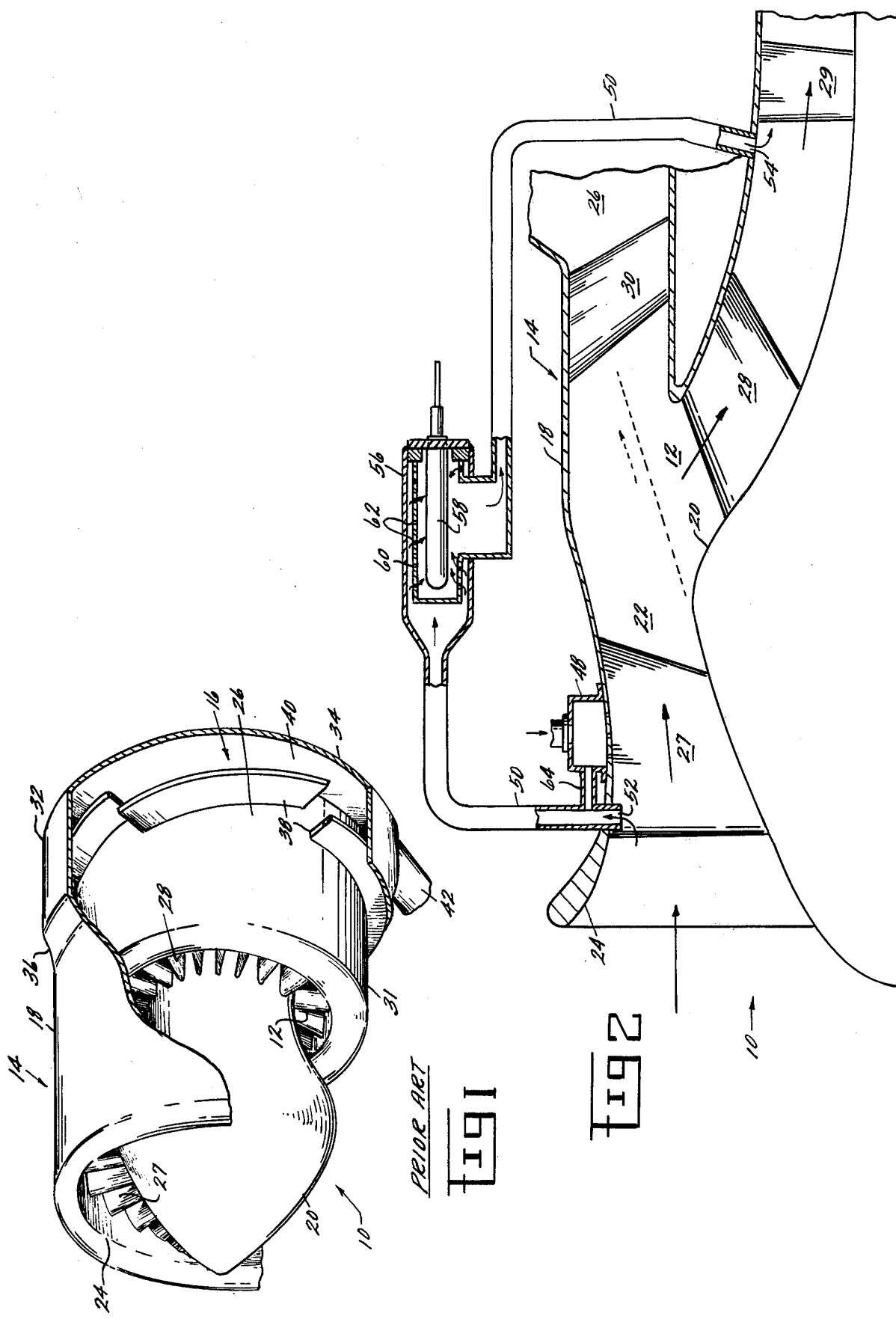
FIG. 1 is a cutaway perspective view of a prior art engine incorporating an inlet particle separator.
FIG. 2 is a cross-sectional view of a portion of a gas turbine engine incorporating the transient air temperature sensing system of this invention.

Referring to FIGS. 1 and 2, therein are shown the front portion of a gas turbine engine 10. The engine includes an inlet particle separator 14 having a scroll scavenge means 16 of the type described in U.S. Pat. No. 3,832,086, assigned to the assignee of this invention. The engine, of which only the inlet portion is shown, typically includes in axially spaced serial flow arrangement a compressor, an annular combustor, a gas generator turbine for driving the compressor, and a low pressure turbine for driving an output shaft or fan, all of which are conventional and well known to the gas turbine art.

The separator 14 has an outer casing or housing indicated generally at 18 and an inner fairing 20, defining therebetween an axially extending annular passageway 22 having at opposite ends thereof an annular inlet 24 and an annular outlet communicating with the engine inlet 12 and an annular particle collection chamber 26. A row of circumferentially spaced, radially extending turning vanes 27, having a desired turning configuration, is located downstream and adjacent the annular inlet 24. A row of circumferentially spaced, radially extending deswirl vanes 28 and a row of circumferentially spaced, radially extending, compressor inlet guide vanes 29 (as best seen in FIG. 2) downstream of the vanes 28 are located downstream and adjacent the engine inlet 12. The particle separator further comprises a plurality of circumferentially spaced turning vanes 38 which radially extend from the engine housing 31 to an axially and circumferentially extending wall member 32. The vanes 38 axially divide the particle collection chamber 26 and define an annular extraction manifold 40 at the aft portion of the collection chamber. Means for ducting extraneous matter from the extraction manifold 40 is provided by a scavenge duct 42 which communicates with the manifold and preferably extends in a tangential direction away from the outer periphery of the extraction manifold. The outside end of the scavenge duct is in flow communication with a scavenge blower (now shown) for establishing a reduced pressure within the duct and drawing out extraneous matter entrained within the annular manifold. The engine further includes an anti-icing duct 48 which, under control of suitable valve means (not shown), selectively ports compressed bleed air for anti-icing purposes in the manner well known in the art.

Referring to FIG. 2, therein is shown the details of the transient air temperature sensing system of this invention. In accordance with the present invention, a feed duct 50 having a temperature sensing element 58 disposed therein is provided for measuring the temperature of the air entering the engine compressor. The duct 50 includes an inlet 52 penetrating the separator housing 18 upstream of the swirl vanes 27 and an outlet 54 disposed intermediate the deswirl vanes 28 and the compressor inlet guide vanes 29. It is preferred that the inlet 52 to the duct 50 is disposed approximately perpendicular to the engine inlet 24 flowpath in order to inhibit ingestion of particles, water and other extraneous matter in the duct 50 and to prevent ice formation therein. The remote temperature sensing probe 58 is disposed within a generally enlarged area 56 of the duct 50. The probe 58 produces a signal proportional to the temperature of the air surrounding it and transmits this signal to the engine control system (not shown). The pressure drop across the particle separator vanes induced by the engine airflow therein creates sufficient bypass flow through the duct 50 to provide a high thermal response rate for the probe 58 without the use of compressor bleed, or other engine air sources which result in engine performance degradation.

In order to further improve its thermal response characteristics, the probe 58 is surrounded by an impingement blanket 60 located within the enlarged area 56 of the duct 50. The impingement blanket 60 includes a plurality of perforations 62 therein for porting airflow to the probe 58. The blanket 60 completely surrounds the probe 58 and its ends are placed in sealing engagement with the interior walls of the duct 50 such that all duct airflow must pass through the perforations 62 therein. The downstream side of the blanket 60 is placed in flow communication with the outlet of the duct 50. In this manner, all air entering the duct inlet 52 passes over the blanket 60 and through the perforations 62 therein, such that the surfaces of the probe 58 are contacted in a substantially uniform manner. Thereafter the air exits the downstream side of the blanket 60 and is ported to the outlet 54 of the duct 50. By uniformly distributing the duct air over the surface of the probe 58 in the impingement blanket acts as a highly sensitive heat transfer device which significantly increases the thermal response time of the probe 58.

In accordance with another feature of this invention, a cross-bleed duct 64 is disposed intermediate the engine anti-icing duct 48 and provides anti-icing airflow from the duct 48 to the duct 50 when the engine anti-icing system is activated. The cross-bleed duct 64 is sized to provide a predetermined quantity of airflow therethrough which is sufficient to elevate the temperature of the probe 58 by the amount required to compensate for the increased temperature of the air entering the compressor inlet 12 during activation of the engine's anti-icing system. During the time when engine anti-icing is not required, airflow through the ducts 48 and 64 is prohibited by closure of the anti-icing valve (not shown) in the duct 48. In this manner, transient reading errors of the probe 58 during activation of the engine anti-icing system are minimized.

Having described preferred embodiments of the present invention, though not exhaustive of all equivalents, it will be appreciated by those skilled in the art that many modifications, substitutions, and changes may be made thereto without departing from the fundamental theme of the invention. Therefore, what is desired to be secured by Letters Patent is as follows.

What is claimed is:

1. In a gas turbine engine of the type which includes an inlet supplying air to a compressor, a combustor and turbine in serial flow relation and a particle separator disposed intermediate the inlet, and compressor and wherein a pressure drop is created across the particle separator by air flowing therethrough, there is provided apparatus for measuring the temperature of the air entering the compressor comprising:
  a feed duct having an inlet, disposed intermediate the engine inlet and the particle separator and an outlet disposed intermediate the particle separator and compressor whereby airflow through the feed duct is generated by the pressure drop across the particle separator, and
  temperature sensitive probe means disposed in the feed duct for remotely transmitting temperature signals.

2. The gas turbine engine of claim 1 wherein the inlet to the feed duct is disposed substantially perpendicular to the engine inlet flowpath in order to inhibit ingestion of extraneous matter into the feed duct.

3. The gas turbine engine of claim 1 wherein the temperature sensitive probe means is surrounded by an impingement blanket having a plurality of perforations disposed therein and wherein the downstream side of the impingement blanket is in flow communication with the feed duct outlet whereby air entering the feed duct passes over the blanket, through the perforations therein to contact the surface of the probe means in a substantially uniform manner and is thereafter discharged through the feed duct outlet.

4. The gas turbine engine of claim 1 further comprising anti-icing duct means for selectively porting compressed bleed air upstream for anti-icing, and
  cross-bleed duct means disposed intermediate the anti-icing duct means and the inlet to the feed duct for porting a predetermined quantity of engine anti-icing air to the feed duct.

5. The gas turbine engine of claim 4 wherein the cross-bleed duct is sized such that the predetermined quantity of anti-icing air is sufficient to elevate the temperature of the probe means by the amount required to compensate for the elevated temperature of the air entering the engine compressor during periods of anti-icing airflow in the anti-icing duct means.

* * * * *